(12) United States Patent
Wang et al.

(10) Patent No.: US 6,689,872 B2
(45) Date of Patent: Feb. 10, 2004

(54) DYE FOR OPTICAL RECORDING MEDIUM

(75) Inventors: Nae-Jen Wang, Kaohsiung (TW); Ching-Huang Chen, Bade (TW); Li-Ling Lin, Kaohsiung (TW); Chao-Nan Kuo, Hsinchu Industrial Park (TW); Wen-Dar Liu, Ilan (TW); Wan-Chun Chen, Keelung (TW); Shyh-yeu Wang, Hsinchu Industrial Park (TW)

(73) Assignee: Ritek Corporation, Hsinchu (TW)

( * ) Notice: Subject to any disclaimer, the term of this patent is extended or adjusted under 35 U.S.C. 154(b) by 0 days.

(21) Appl. No.: 10/247,051

(22) Filed: Sep. 17, 2002

(65) Prior Publication Data

US 2003/0148216 A1 Aug. 7, 2003

(30) Foreign Application Priority Data

Dec. 19, 2001 (TW) ........................................ 90131443 A

(51) Int. Cl.[7] .............................................. C09B 45/00
(52) U.S. Cl. ........................ 534/703; 534/705; 534/707; 534/710
(58) Field of Search ................................. 534/703, 705, 534/707, 710; 430/270.16

(56) References Cited

U.S. PATENT DOCUMENTS

| 4,083,843 A | * | 4/1978 | Carlson ...................... 534/765 |
| 5,077,200 A | * | 12/1991 | Habenstein .................. 435/14 |
| 5,330,542 A | | 7/1994 | Maeda et al. ................. 8/639 |
| 6,225,023 B1 | | 5/2001 | Okamoto et al. ......... 430/270.16 |

FOREIGN PATENT DOCUMENTS

JP 2002-274040 * 9/2002

OTHER PUBLICATIONS

Baldwin et al., Inorganic Chemistry, 8(1), 107–115, 1969.*
Beadle et al., Chemical Abstracts, 67:60479, 1967.*
Grzeskowiak et al., Chemical Abstracts, 84:16406, 1976.*
Majumdar et al., Chemical Abstracts, 129:117012, 1998.*
Shibata et al., Analytica Chimica Acta, 81(1), 131–141, 1976.*

* cited by examiner

Primary Examiner—Fiona T. Powers
(74) Attorney, Agent, or Firm—J.C. Patents

(57) ABSTRACT

An optical recording medium dye is described. The optical recording medium dye is an azo metal chelate compound, wherein the azo metal chelate compound comprises the following structure:

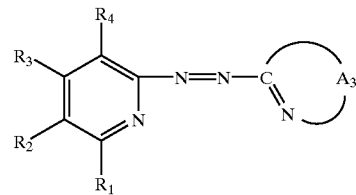

wherein $R_1$ is a hydrogen atom, a $C_{1-6}$ straight chain or branched alkyl group, an amino group, an alkylamino group or a tolylamino group; $R_2$ is a hydrogen atom, a hydroxyl group, a halogen atom, an ether group, a $C_{1-6}$ straight chain or branched alkyl group; $R_3$ is a hydrogen atom, a $C_{1-6}$ straight chain or branched alkyl group; $R_4$ is a hydrogen atom, a $C_{1-6}$ straight chain or branched alkyl group or a halogen atom; $A_3$ is a residue forming a heterocyclic ring derivative together with a carbon atom and a nitrogen atom.

5 Claims, No Drawings

DYE FOR OPTICAL RECORDING MEDIUM

BACKGROUND OF THE INVENTION

1. Field of the Invention

The present invention relates to an optical recording medium. More particularly, the present invention relates to a dye for an optical recording medium.

2. Description of Related Art

Compact disk (CD) comprises the following advantageous qualities: high storage capacity, small volume, stability over long storage period, low production cost, high compatibility and low error rate. Compact disk thus becomes a major optical information recording medium. Amongst the various types of compact disk, the most popular is the Compact Disk-Recordable (CD-R), which is a recording medium capable of recording and retrieving information by means of a laser beam having a wavelength of 770 nm to 830 nm.

Through the popularization of multimedia, large amount of textual, sound and image data are generated. The original 650 MB capacity CD-R can no longer accommodate the audio-visual demand of the next generation. Therefore, the industry introduces a Digital Versatile Disc-Recordable (DVD-R) with a memory capacity several times of that of the CD-R. The Digital Versatile Disc-Recordable (DVD-R) has the capability for recording and retrieving information in a high density because semiconductor lasers having shorter wavelengths than that for the conventional CD-R (for example, lasers having wavelengths 620 nm to 690 nm) are used for recording and retrieving information. DVD-R is going to be a major optical information recording medium.

The write-once version of the DVD-R uses an organic dye as a recording layer. Recording is performed by irradiating a short-wavelength laser to the dye-based recording layer. Upon the absorption of the laser beam energy, the irradiated portion of the recording layer will undergo a thermal deformation. This basically forms a pit that represents the digital bit being recorded. The most commonly used organic dye includes cyanine dye, azo dye, benzofuryl ketone dye, indigo dye, etc. However, using the above dyes as a recording layer for an optical recording medium, there is a problem of poor optical stability. Especially the short wavelength laser is used to perform the recording/reproduction, the stability of the stored data, the reflection rate and photosensitivity will be adversely affected. Normally, the above dyes are incorporated with the various organic dye metal chelate compound to improve the photo stability.

A conventional optical recording medium dye, as disclosed in U.S. Pat. No. 5,330,542, includes an azo metal chelate compound comprising an azo type compound of the following structure (I):

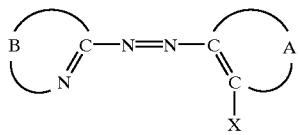

(I)

wherein, x is a group having an active hydrogen; A is a residue forming a benzene ring derivative, for example, benzene, naphthalene, etc., together with two carbon atoms; and B is a residue forming a benzene ring derivative or a heterocyclic ring derivative, for example, benzene, naphthalene, thiazole, benzothiazole, pyridine, quinoline, pyridobenzothizole, pyrazole, etc., together with a carbon atom and a nitrogen atom.

Another conventional optical recording medium dye, as disclosed in U.S. Pat. No. 6,225,023, includes an azo metal chelate compound comprising an azo type compound of the following structure (II) or (III):

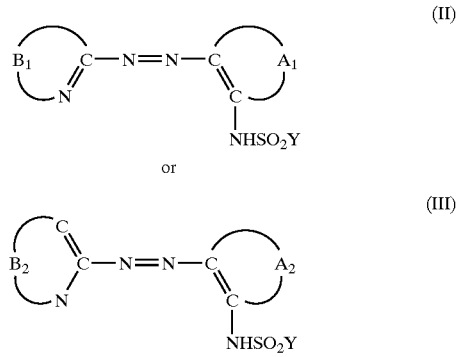

or wherein each of $A_1$ and $A_2$ is a residue forming a benzene ring derivative or a heterocyclic ring derivative together with two carbon atoms. The heterocyclic ring derivative includes, for example, benzene, naphthalene, pyridine, etc.; each of $B_1$ and $B_2$ is a residue forming together with the carbon atom and the nitrogen atom to form a heterocyclic ring derivative, for example, benzene, naphthalene, thiazole, benzothiazole, pyridine, quinoline, pyridobenzothizole, pyrazole ring, etc.; Y is a $C_{1-6}$ linear or branched alkyl group.

The above azo type of dye is formed by having the nitrogen on the heterocyclic ring and the active group on the benzene ring to chelate with the metal. It is therefore necessary to introduce an active group to the benzene ring. An introduction of an active group to the azo compound normally requires other coupling processes.

SUMMARY OF THE INVENTION

Accordingly, the present invention provides an optical recording medium dye. The dye of the present invention is an azo metal chelate compound, wherein the nitrogen atom on the heterocyclic ring of the azo compound directly chelates with the metal. An introduction of an active group is precluded.

The present invention further provides an optical recording medium dye wherein the optical stability of this material is favorable. Further, the material is applicable as a data layer of an optical recording medium in which short wavelength laser can use for recording or reproduction.

In accordance to the present invention, an optical recording medium dye is provided, wherein this optical recording medium dye is an azo metal chelate compound. This azo metal chelate compound comprises an azo type compound of the following structure (IV):

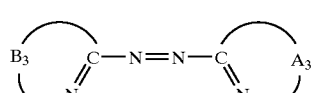

(IV)

wherein $A_3$ and $B_3$ are residues forming a heterocyclic ring derivative together with the carbon atom and the nitrogen atom. The heterocyclic ring derivative includes derivatives of an imidazole group, a thiazole group, an oxazole group, a benzothiazole group, a benzopyridoxinethiazol group, a pyridoxinethiazole group, a pyridine group, a pyridazine group, a pyrimidine group, a pyrazine group, a triazine group, a quionline group, a pyridobenzothiazole group, a pyrazole group, or the above heterocyclic ring derivatives that contain the following substituent: a halogen atom, a nitro group, a cyano group, an amino group, a formyl group, a hydroxyl group, a carboxyl group, an alkylamino group, a substituted $C_{1-15}$ straight chain alkyl group, an unsubstituted $C_{1-15}$ straight chain alkyl group, a branched alkyl group, a cycloalkyl group, an alkoxy group, an alkyl carbonyl group, a straight chain alkenyl group, a branched alkenyl group, a cylcoalkenyl group, a hydroxyalkyl group, an alkoxycarbonyl group, an alkoxycarbonylallyl group, an alkylthio group, an alkylsulfonyl group, an aryl group or a heterocyclic group.

If the

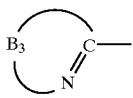

part of the above structure (IV) is, for example, a pyridine derivative, the above azo compound structure (V) can be represented as follow:

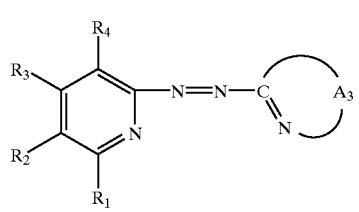

(V)

wherein $R_1$ is, for example, a hydrogen atom, a $C_{1-6}$ straight chain or branched alkyl group, an amino group, an alkylamino group or a tolylamino group; $R_2$ is, for example, a hydrogen atom, a hydroxyl group, a halogen group, an ether group, an ester group or a $C_{1-6}$ straight chain or branched alkyl group; $R_3$ is a hydrogen atom, a $C_{1-6}$ straight chain or branched alkyl group; $R_4$ is, for example, a hydrogen atom, a $C_{1-6}$ straight chain or branched alkyl group or a halogen atom; $A_3$ is a residue forming a heterocyclic ring derivative together with the carbon atom and the nitrogen atom.

The above heterocyclic ring derivative includes derivatives of an imidazole group, pyrazole group, a triazole group, a tetrazole group, a benzoimidazole group, a thiazole group, an isothiazole group, a thiadiazole group, a thiatriazole group, a benzothiazole group, an oxazole group, an isoxazole group, an oxadiazole group, an oxatriazole group, a benzoxazole group, etc.

Thus, the

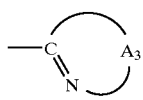

part of the above structure (V) includes, for example,

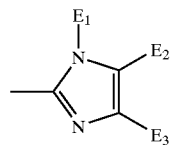
(1)

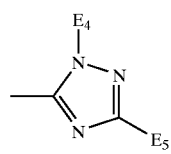
(2)

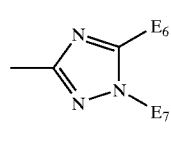
(3)

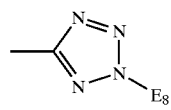
(4)

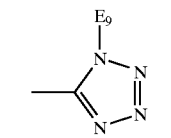
(5)

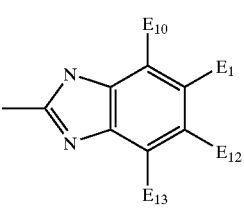
(6)

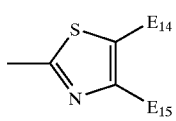
(7)

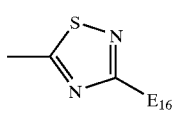
(8)

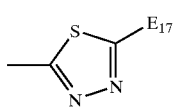
(9)

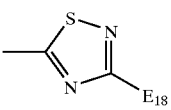
(10)

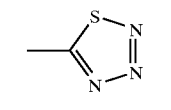
(11)

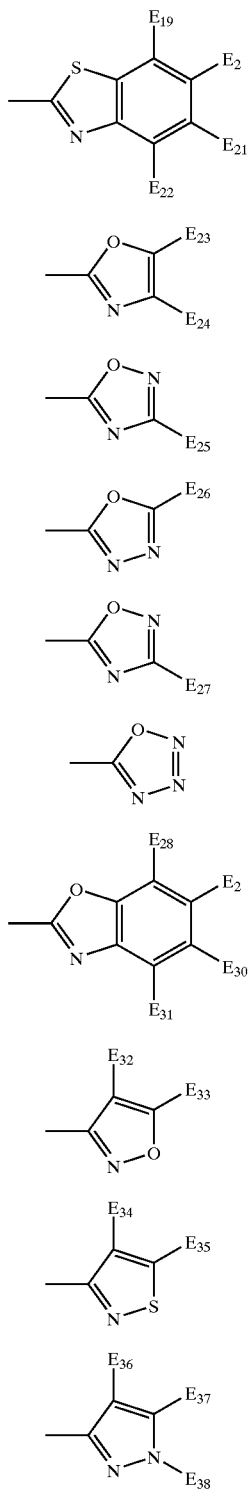

wherein the substituent $E_1$ to $E_{38}$ each includes, for example, a hydrogen atom, a halogen atom, a nitro group, a cyano group, an amino group, a formyl group, a hydroxyl group, a carboxyl group, an alkylamino group, a substituted or unsubstituted $C_{1-15}$ straight chain alkyl group, a branched alkyl group, a cycloalkyl group, an alkoxy group, an alkyl carbonyl group, a straight chain alkenyl group, a branched alkenyl group, a cycloalkenyl group, a hydroxyalkyl group, an alkoxycarbonyl group, an alkoxycarbonylallyl group, an alkylthio group, an alkylsulfonyl group, an aryl group or a heterocyclic group.

The metal ion for forming the azo metal chelate compound includes nickel, cobalt, iron, ruthenium, rhodium, palladium, copper, iridium, platinum, zinc, etc.

The optical recording medium dye of the present invention is an azo dye of a heterocyclic ring and a heterocyclic ring. Further, chelating with the metal is through the nitrogen on the heterocyclic ring. Introduction of an active group is thus obviated. Further, the greatest UV-V is absorption wavelength is lower than 650 nm. The azo recording medium dye of the present invention is thus applicable as a recording layer of an optical recording medium in which short wavelength laser can use for recording and reproduction.

It is to be understood that both the foregoing general description and the following detailed description are exemplary, and are intended to provide further explanation of the invention as claimed.

DESCRIPTION OF THE EMBODIMENTS

The following embodiment details the optical recording medium dye of the present invention.

The present invention provides an optical recording medium dye, which comprises an azo type dye metal chelate compound that comprises a heterocyclic ring and a heterocyclic ring. This type of azo metal chelate compound has the following structure (IV):

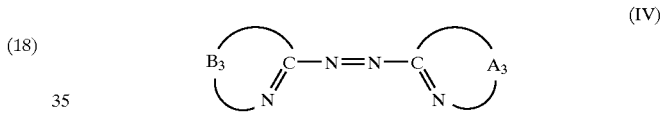

(IV)

wherein $A_3$ and $B_3$ are residues forming a heterocyclic ring derivative together with the carbon atom and the nitrogen atom, and the heterocyclic ring includes derivatives of an imidazole group, a thiazole group, an oxazole group, a benzothiazole group, a benzopyridoxinethiazole group, a pyridoxinethiazole group, a pyridine group, a pyridazine group, a pyrimidine group, a pyrazine group, a triazine group, a quinoline group, a pyridobenzothiazole group, a pyrazole group, or the above heterocyclic ring derivatives that contain the following substituent: a halogen atom, a nitro group, a cyano group, an amino group, a formyl group, a hydroxyl group, a carboxyl group, an alkylamino group, a substituted $C_{1-15}$ straight chain alkyl group, an unsubstituted $C_{1-15}$ straight chain alkyl group, a branched alkyl group, a cycloalkyl group, an alkoxy group, an alkyl carbonyl group, a straight chain alkenyl group, a branched alkenyl group, a cylcoalkenyl group, a hydroxyalkyl group, an alkoxycarbonyl group, an alkoxycarbonylallyl group, an alkylthio group, an alkylsulfonyl group, an aryl group or a heterocyclic group.

If the

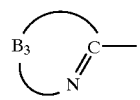

part of the above structure (IV) is, for example, a pyridine derivative, the above azo compound structure (V) can be represented as follow:

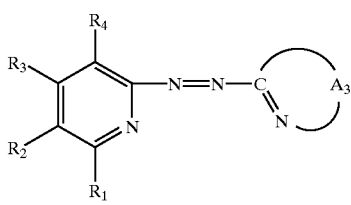
(V)

wherein $R_1$ is a hydrogen atom, a $C_{1-6}$ straight chain or branched alkyl group, an amino group, an alkylamino group or a tolylamino group; $R_2$ is a hydrogen atom, a hydroxyl group, a halogen atom, an ether group, an ester group or a $C_{1-6}$ straight chain or branched alkyl group; $R_3$ is a hydrogen atom, a $C_{1-6}$ straight chain or branched alkyl group; $R_4$ is a hydrogen atom, a $C_{1-6}$ straight chain or branched alkyl group or a halogen atom; $A_3$ is a residue forming a heterocyclic ring derivative, for example, derivatives of an imidazole group, a pyrazole group, a triazole group, a tetrazole group, a benzoimidazole group, a thiazole group, an isothiazole group, a thiadiazole group, a thiatriazole group, a benzothiazole group, an oxazole group, an isoxazole group, an oxadiazole group, an oxatriazole group, a benzoxazole group, etc., together with the carbon atom and the nitrogen atom.

Thus, the

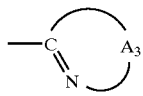

part of the above structure (V) includes, for example,

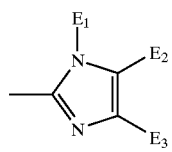 (1)

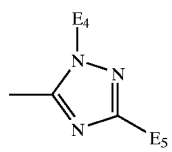 (2)

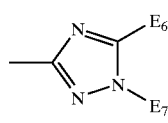 (3)

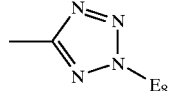 (4)

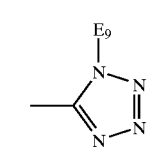 (5)

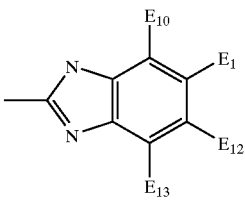 (6)

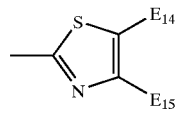 (7)

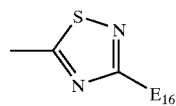 (8)

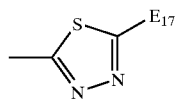 (9)

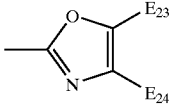 (13)

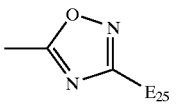 (14)

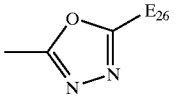 (15)

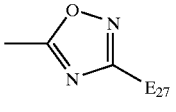 (16)

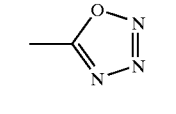 (17)

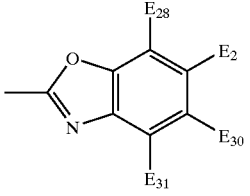 (18)

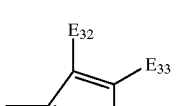 (19)

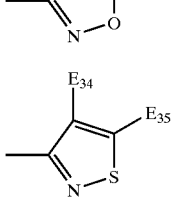 (20)

-continued

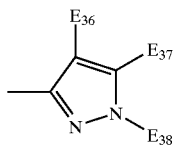

(21)

wherein the substituent $E_1$ to $E_{38}$ each includes, for example, a hydrogen atom, a halogen atom, a nitro group, a cyano group, an amino group, a formyl group, a hydroxyl group, carboxyl group, an alkylamino group, a substituted or unsubstituted $C_{1-15}$ straight chain alkyl group, a branched alkyl group, a cycloalkyl group, an alkoxy group, a carbonyl group, a straight chain alkenyl group, a branched alkenyl group, a cycloalkenyl group, a hydroxyalkyl group, an alkoxycarbonyl group, an alkoxycarbonylallyl group, an alkylthio group, an alkylsulfonyl group, an aryl group or a heterocyclic group.

The halogen atom includes fluorine, chlorine and bromine. The alkyl group includes, for example, methyl, ethyl, propyl, isopropyl, butyl, pentyl, etc. The cycloalkyl group includes cyclopropyl, cyclobutyl, cyclopentyl, etc. The alkoxy group includes methoxy, ethoxyl, n-propoxyl, isopropoxyl, n-butoxyl, i-butoxyl, t-butoxyl, pentoxyl, etc. The alkyl carbonyl group includes formyl, acetyl, propionyl, butyryl, i-butyryl, etc. The alkenyl group includes vinyl, propenyl, butenyl, pentenyl, hexenyl, etc. The cycloalkenyl group includes cyclopentenyl, cyclohexenyl, etc. The hydroxyalkyl group includes, for example, hydroxymethyl, hydrozyethyl, etc. The alkoxycarbonyl group includes, for example, methoxycarbonyl, ethoxycarbonyl, n-propoxycarbonyl, iso-propoxycarbonyl, n-butoxycarbonyl, iso-butoxycarbonyl, tert-butoxycarbonyl, etc. The alkylamino group includes, for example, methylamino, ethylamino, n-propylamino, n-butylamino, dimethylamino, diethylamino, etc. The alkoxycarbonylallyl group includes, for example, methoxycarbonylmethyl, ethoxycarbonylmethyl, n-propoxycarbonylmethyl, iso-propoxycarbonylmethyl, etc. The alkylthio group includes, for example, methylthio, ethylthio, n-propylthio, iso-butylthio, tert-butylthio, etc. The alkylsulfonyl group includes, for example, methylsulfonyl, ethylsulfonyl, n-propylsulfonyl, iso-propylsulfonyl, n-butylsulfonyl, iso-butylsulfonyl, tert-butylsulfonyl, etc. The aryl group includes, for example, phenyl, tolyl, xylyl, ethylphenyl, etc. The heterclyclic group includes pyridyl, imidazolyl, furyl or thenoyl, etc.

Further, the metal ion that forms the chelate compound with the azo dye compound of the present invention includes, for example, nickel, cobalt, iron, ruthenium, rhodium, palladium, copper, iridium, platinum, zinc, etc.

The method for fabricating an optical recording medium dye of the present invention comprises subjecting the heterocyclic ring derivative (such as, derivatives of imidazole, pyrazole, triazole, tetrazole, benzoimidazole, thiazole, isothiazole, thiadiazole, thiatriazole) to heavy nitridation, followed by performing a coupling reaction with pyridine A chelating reaction with metal ion is further performed. The heterocyclic derivative is first dissolved in acetic acid. Concentrated sulfuric acid is drop added to the heterocyclic derivative solution, followed by adding nitrosylsulfuric acid. The mixture is then allowed to react for three hours at low temperature, followed by adding urea to obtain solution (A). The pyridine derivative is dissolved in water or alcohol type of solvent, followed by adding sodium acetate. The above solution (A) is further dropped added to the pyridine solution. After the entire solution (A) is added, mixing is continued for another three hours. Filtering is then performed to collect a solid substance, wherein the solid substance constitutes an azo product. The above azo product is dissolved in an alcohol type of solvent. Nickel acetate is drop added to the azo product solution. After mixing for 6 hours, a solid substance is collected subsequent to filtering. The solid substance constitutes an azo metal chelate compound.

The above heterocyclic ring derivative includes derivatives of an imidazole group, pyrazole group, a triazole group, a tetrazole group, a benzoimidazole group, a thiazole group, an isothiazole group, a thiadiazole group, a thiatriazole group, a benzothiazole group, etc., for example, 2-aminoimidazole, 2-amino-4,5-dicyanoimidazole, 3-aminopyrazole, 2-aminotrizole 3-amino-1,2,4-triazole, 3-amino-5-methylthio-1H-1-2-4-triazole, 5-amino-1,2,3,4-tetrazole, 4-amino-1,2,3,5-tetrazole, 2-aminobenzoimidazole, 2-aminothiazole, 3-aminoisothiazole, 3-amino-t-methylisothiazole, 2-amino-5-methyl-1,2,4-thiaziazole, 5-amino-1,2,3,4-thiatrizole, 4-amino-1,2,3,5-thiatriazole, 2-aminobenzothiazole, 2-aminoxazole, 3-aminoisoxazole, 3-amino-5-methylisoxazole, 2-amino-5-methyl-1,2,4-oxadiazole, 5-amino-1,2,3,4-oxatriazole-4-amino-1,2,3,5-oxatriazole, 2-aminobenzoxazole, etc.

The above pyridine derivative includes, for example, 2-amino-3-hydroxypyridine, 2-bromo-3-hydroxypyridine, 3,5-dibromopyridine, 3-chloropyridine, 3,5-dichloropyridine, 3-bromopyridine, 3,5-dibromopyridine, etc.

The present invention is going to describe according to Experiment 1 to Experiment 3; however, it is intended that the present invention also encompasses modifications and variations provided by what is described in Experiment 1 to Experiment 3.

EXPERIMENT 1

5 g of 3-aminoisoxazole is dissolved in 12 ml of acetic acid solution. 12 ml of concentrated sulfuric acid is drop added to the 3-aminoisoxazole solution, followed by adding 11.4 g of nitrosylsulfuric acid under a temperature of 10 degrees Celsius to 30 degrees Celsius. After mixing at a low temperature for about 3 hours, 6 g of urea is added and mixed evenly to obtain solution (A).

6.5 g of 2-amino-3-hydroxylpyridine is dissolved in 200 ml of water, followed by adding 6.5 g of sodium acetate. The pyridine solution is then placed in an ice bath. Solution A is slowly drop added to the pyridine solution at a low temperature of 0 to 10 degrees Celsius. After the entire solution A is drop added, mixing is maintained for about 3 hours. Filtering is then performed to collect a solid substance, which is the azo product.

The above azo product is then dissolved in 30 ml of methanol, followed by drop adding the nickel acetate solution to the azo solution. The nickel acetate solution is formed by dissolving 3.6 g of nickel acetate in 20 ml of methanol. After mixing for 6 hours, filtering is performed to collect a solid substrate, which is an azo compound that chelates with nickel. This azo metal chelate compound is as follow:

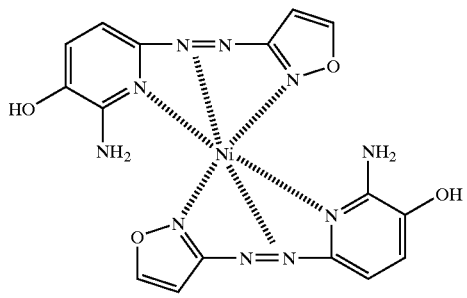

(IV)

Thereafter, the above azo metal chelate compound is dissolved in methanol to form a dilute solution. The dilute azo chelate compound solution is then coated on a substrate. The maximum absorption wavelengths of the solution and the thin film formed by the solution are then measured by Hitachi UV-V is spectrophotometer 3010. The maximum UV-V is wavelength absorption λ max (in MeOH) of the above azo metal chelate compound in a solution is 506 nm. The maximum UV-V is wavelength absorption λ max (thin film) of a thin film formed by the above azo metal chelate compound solution is 542.2 nm.

EXPERIMENT 2

10 gm of the above 3-amino-5-methylthio-1H-1,2,4-triazole is dissolved in 25 ml of acetic acid solution. 12.5 ml of concentrated sulfuric acid is drop added to the 3-amino-5-methylthio-1H-1,2,4-triazole solution, followed by adding 14.7 g nitrosylsullfuric acid under a temperature of 10 to 20 degrees Celsius. After mixing for about 3 hours at a low temperature, 7 g of urea is further added and mixed evenly to obtain solution (B).

13.4 g of 2-bromo-3-hydroxypyridine is dissolved in 500 ml of water, followed by adding 15 gm of sodium acetate. The 2-bromo-3-hydroxypyridine solution is then placed in an ice bath. Solution (B) is drop added at low temperature to the 2-bromo-3-hydroxypyridine solution. After solution (B) is completely added, mixing is continued for 3 hours. Solid substance is collected after filtering, wherein the solid substance constitutes an azo product.

7 g of the above azo product is first dissolved in 100 ml of methanol. Nickel acetate solution, which is formed by dissolving 5.5 g of nickel acetate in 100 ml of methanol, is drop added to the azo product solution. After mixing for 6 hours, solid substance is collected. The solid substance is an azo metal chelate compound having the following structure:

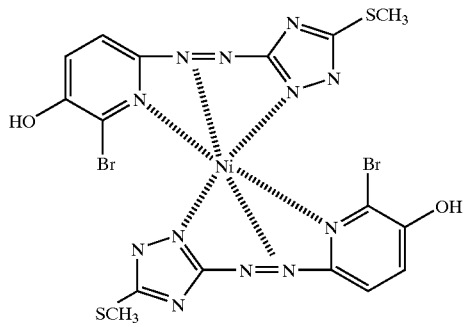

(VII)

Thereafter, the above azo metal chelate compound is dissolved in methanol to form a dilute solution. The dilute azo metal chelate compound solution is then coated on a substrate. The maximum absorption wavelength of the above solution is measured by Hitachi UV-V is spectrophotometer 3010. The maximum UV-V is wavelength absorption λ max (in MeOH) of the above azo metal chelate compound in a solution is 503.6 nm.

EXPERIMENT 3

8 g of 2-aminothiazole is dissolved in 40 ml of acetic acid solution. 20 ml of concentrated sulfuric acid is drop added to the 2-aminothiazole solution, followed by adding 15.2 g of nitrosylsulfuric acid at a temperature of 10 degrees Celsius to 30 degrees Celsius. After mixing for about 3 hours at a low temperature, 7.2 g of urea is further added and mixed evenly to obtain solution (C).

8.8 g of 2-amino-3-hydroxylpyridine is dissolved in 640 ml of water, followed by adding 32 g of sodium acetate. The 2-amino-3-hydroxylpyridine solution is then placed in an ice bath. Solution (C) is then slowly drop added to the 2-amino-3-hydroxylpyridine solution. After the solution (C) is completely added, mixing is continued for another 3 hours. Solid substance is collected after filtering, wherein the solid substance is an azo product.

3 g of the above azo product is dissolved in 30 ml of methanol. Nickel acetate solution, which is formed by dissolving 3.4 g of nickel acetate to 20 ml of methanol, is then drop added to the azo product solution. After mixing for 6 hours, a solid substance is collected after filtering, wherein the solid substance is an azo nickel chelate compound having the following structure:

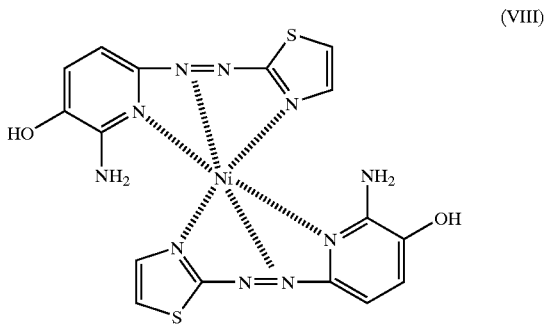

(VIII)

Thereafter, the above azo metal chelate compound is dissolved in methanol to form a dilute solution. The dilute azo chelate compound solution is then coated on a substrate. The maximum absorption wavelengths of the solution and the thin film formed by the solution are then measured by Hitachi UV-V is spectrophotometer 3010. The maximum UV-V is absorption wavelength λ max (in MeOH) of the above azo chelate metal compound in a solution is 546.8 nm. The maximum UV-V is absorption wavelength λ max (thin film) of a thin film formed by the above azo metal chelate compound solution is 587.6 nm.

Based on the results of the above Experiment 1 to Experiment 3, the maximum UV-V is absorption wavelength of the optical recording medium dye of the present invention is less than 650 nm. The optical recording medium dye of the present invention is therefore applicable as a recording layer of an optical recording medium using a short wavelength laser for recording and reproduction. The optical recording medium dye of the present invention is an azo dye of a heterocyclic ring and a heterocyclic ring, in which the metal atom is directly chelated to the nitrogen of the heterocyclic ring. An introduction of an active group is thus obviated.

Optical Recording Medium

The above azo metal chelate compound (obtained from experiment 1, experiment 2 or experiment 3) is dissolved in 10 ml of tetrafluoroproanol. Filtrate is obtained after filtering with 0.25 μm filter paper. 5 ml of the filtrate is then spin-coated to form a spin-coating layer on a polycarbonate resin substrate with a thickness of 0.6 mm and a diameter of 12 cm, spinning at a speed of 500 rpm. The above substrate surface further comprises a trench having a width of 0.3 μm and a depth of 160 nm. The substrate having an optical dye spin-coated thereon is then dried under a temperature of about 85 degrees Celsius for about 20 minutes.

Thereafter, a 100 nm thick gold layer, serving as a reflecting layer, is then sputtered on the spin-coated layer. An UV-cured resin is further spin-coated on the anti-reflecting layer, wherein the UV-cured resin is irradiated and cured with an UV light to form a 4 μm thick protective layer. The manufacturing of an optical recording medium is thus completed. The recording layer is further adhered to a 0.6 mm thick PC substrate to form a 1.2 mm thick disk.

The above optical recording medium is spun at a speed of 3.5 m/s and is irradiated with a semiconductor laser at a wavelength of 658 nm and with a power of about 9.0 MW to record 8–16 modulation signals. Thereafter, the above optical recording medium is placed in a DVD player using a 658 nm wavelength semiconductor laser to perform the reproduction test. Desirable reproduction signal is obtained. The above optical recording medium is further subjected to xenon light to perform the stability test, wherein desirable stability is also obtained.

Therefore, the optical recording dye of the present invention used as a recording layer of an optical recording medium is applicable for an optical recording medium in which short wavelength laser is used for recording and reproduction.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical recording medium dye, wherein the optical recording medium dye is an an azo type compound that chelates with a metal, and the azo type compound has a structure of:

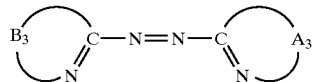

wherein $A_3$ and $B_3$, each is a residue forming a heterocyclic ring derivative together with a carbon atom and a nitrogen atom, and the heterocyclic ring derivative is selected from the group consisting of derivatives of a thiazole group, an oxazole group, a benzothiazole group, a benzopyridoxinethiazole group, a pyridoxinethiazole group, a pyridazine group, a pyrimidine group, a pyrazine group, a triazine group, a quinoline group, a pyridobenzothiazole group, and a pyrazole group, wherein the derivatives of the thiazole group, the oxazole group, the benzothiazole group, the benzopyridoxinethiazole group, the pyridoxinethiazole group, the pyridazine group, the pyrimidine group, the pyrazine group, the triazine group, a quinoline group, the pyridoxinethiazole group, the pyrazole group contains no or a substituent, wherein the substituent is selected from the group consisting of a halogen atom, a nitro group, a cyano group, an amino group, a formyl group, a carboxyl group, an alkylamino group, a substituted $C_{1-15}$ straight chain alkyl group, an unsubstituted $C_{1-15}$ straight chain alkyl group, a branched alkyl group, a cycloalkyl group, an alkoxy group, an alkyl carbonyl group, a straight chain alkenyl group, a branched alkenyl group, a cylcoalkenyl group, a hydroxy-alkyl group, an alkoxycarbonyl group, an alkoxycarbonyla-llyl group, an alkylthio group, an alkylsulfonyl group, an aryl group and a heterocyclic group.

2. The optical recording medium dye of claim 1, wherein the metal is nickel, cobalt, iron, ruthenium, rhodium, palladium, copper, iridium, platinum or zinc.

3. An optical recording medium dye, wherein the optical recording medium dye comprises an azo compound that chelates with a metal, the azo compound comprises a structure:

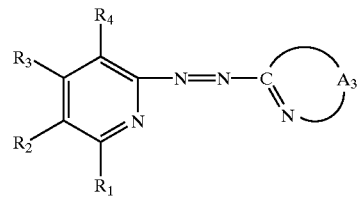

wherein $R_1$ is a hydrogen atom, a $C_{1-6}$ straight chain alkyl group, a $C_{1-6}$ branched alkyl group, an amino group, an alkylamino group or a tolylamino group; $R_2$ is a hydrogen atom, an ether group, an ester group, a halogen atom, a $C_{1-6}$ straight chain alkyl group or a $C_{1-6}$ branched alkyl group; $R_3$ is a hydrogen atom, a $C_{1-6}$ straight chain alkyl group or a $C_{1-6}$ branched alkyl group; $R_4$ is a hydrogen atom, a $C_{1-6}$ straight chain alkyl group, a $C_{1-16}$ branched alkyl group or a halogen atom; $A_3$ is a residue forming a heterocyclic ring derivative together with a carbon atom and a nitrogen atom, wherein the $A_3$ heterocyclic ring derivative is pyrazole group, a triazole group, a tetrazole group, a benzoimidazole group, a thiazole group, an isothiazole group, a thiadiazole group, a thiatriazole group, a benzothiazole group, an oxazole group, an isoxazole group, an oxadiazole group, an oxatriazole group or a benzoxazole group.

4. The optical recording medium dye of claim 3, wherein a

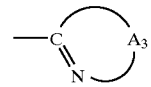

part of the structure is

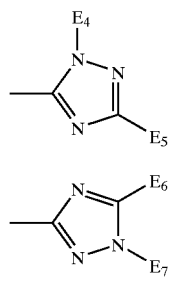

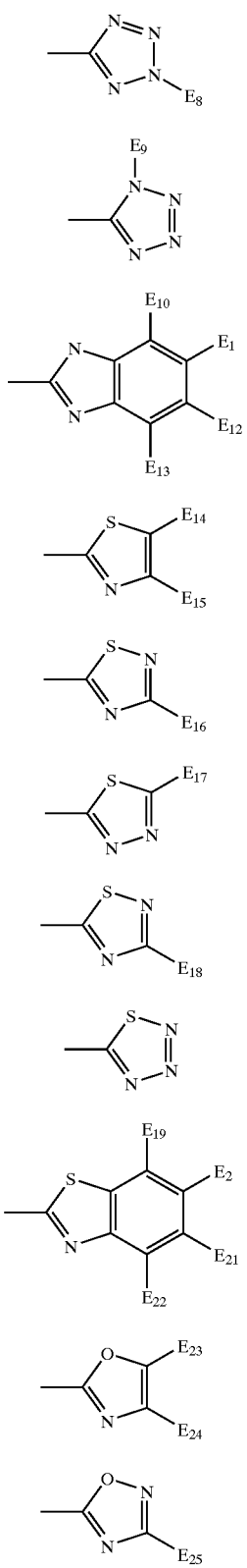

wherein the substituent $E_1$ to $E_{38}$ is a hydrogen atom, a halogen atom, a nitro group, a cyano group, an amino group, a formyl group, a hydroxyl group, a carboxyl group, an alkylamino group, a substituted $C_{1-15}$ straight chain alkyl group, an unsubstituted $C_{1-15}$ straight chain alkyl group, a branched alkyl group, cycloalkyl group, an alkoxy group, an alkyl carbonyl group, a straight chain alkenyl group, a branched alkenyl group, a cycloalkenyl group, a hydroxyalkyl group, an alkoxycarbonyl group, an alkoxycarbonylallyl group, an alkylthio group, an alkylsulfonyl group, an aryl group or a heterocyclic group.

5. The optical recording medium dye of claim 3, wherein the metal is nickel, cobalt, iron, ruthenium, rhodium, palladium, copper, iridium, platinum or zinc.

* * * * *